Nov. 5, 1940.  H. KÖHLER  2,220,158

ELECTRICAL CONNECTOR

Filed Aug. 21, 1937

INVENTOR
HELMUT KOEHLER
BY
ATTORNEY

Patented Nov. 5, 1940

2,220,158

UNITED STATES PATENT OFFICE 2,220,158

ELECTRICAL CONNECTOR

Helmut Köhler, Berlin, Germany, assignor to Telefunken Gesellschaft für Drahtlose Telegraphie m. b. H., Berlin, Germany, a corporation of Germany Application August 21, 1937, Serial No. 160,228
In Germany June 9, 1936

3 Claims. (Cl. 173—332)

My invention relates broadly to plugs and connectors and more particularly to such an arrangement as is particularly adaptable for use with television cameras.

Modern television cameras embrace the use of a scanning tube, amplifying units, and oscillating circuits for supplying voltages or currents to the deflecting means of the scanning tube. This apparatus is all mounted within the television camera and it is necessary to supply biasing and energizing potentials of a fairly wide varying range. In addition, the signals representative of the view to be analyzed are usually amplified and passed on to modulating means at the transmitter. In this respect it has been customary in the past to provide a cable arrangement which contained all of the necessary conductors and these conductors have been fastened into place within the camera itself.

It is highly desirable to make the units, as for instance the amplifying unit and the saw-tooth oscillating unit, in the form of a removable structure in order that new tubes may be inserted without the possibility of disturbing the other apparatus, or adjustments within the apparatus may be made, or the unit itself may need repairs. As a result, it is desirable to have some form of structure in which the cables supplying the biasing potentials etc. may be readily removed from the unitary structures without the necessity, for instance, of removing solder or unscrewing the caps from a common type of terminal fastener.

According to my invention, the unitary structures containing the amplifier, saw-tooth oscillator, etc. are made so that a socket containing the necessary leads for each unit is formed in the unit itself, and these units are energized by a plug type of structure, and the arrangement is such within the camera itself that when the plug is inserted into the opening in the camera then each portion of the plug co-acts with a portion of the socket member which properly energizes, or rather furnishes the correct biasing potential to the proper lead within the unitary structure. It will be seen, therefore, that the plug member itself being unitary in arrangement has a number of mutually insulated portions which act as conductors, the latter properly co-acting with a section of the socket so that the arrangement is such that the structures may be readily removed without taking out leads, unsoldering portions, etc. Thus, with this construction the mere insertion of the plug into the opening into the camera insures correct action.

Figure 1:
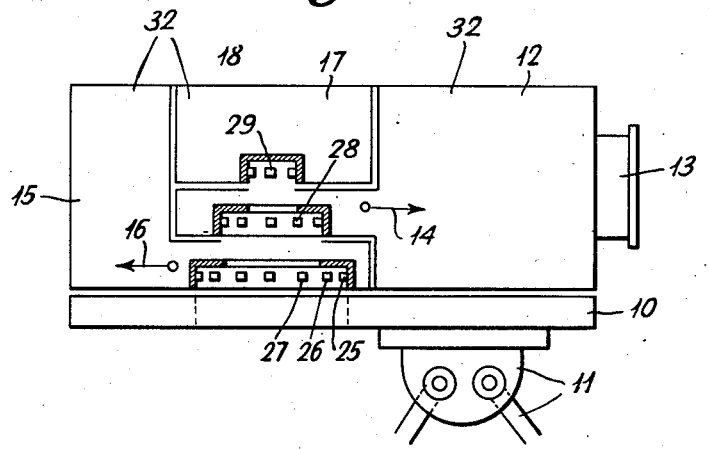
Figure 2:
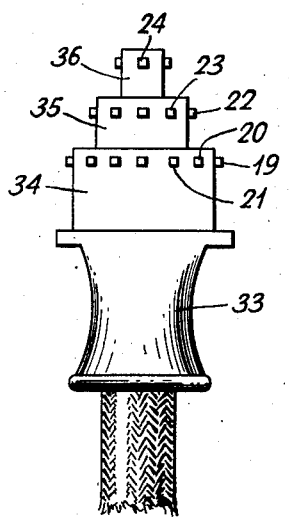

My invention will best be understood by reference to the figures of the drawing in which Fig. 1 shows the socket or female section of the arrangement with the camera, and Fig. 2 shows the plug construction.

Referring to the drawing, there is represented a television camera or analyzer having a baseplate 10 arranged on a stand 11. Mounted on the plate 10 is a housing 32 which may contain the picture analyzing tube, the saw-tooth oscillator for furnishing deflecting potentials and the signal amplifier, and the objective lens 13. The housing may be removed as indicated in direction by the arrow 14 and that section of the housing 15 may produce the deflection potentials and is removable in the direction of the arrow 16. That section of the housing identified as 12 will contain the analyzing tube, and that section of the housing identified as 17 may contain the amplifier, the latter being removable in the direction of the arrow 18. It should be borne in mind that the numeral 32 refers to the complete housing for all parts, and that the numerals 12, 15 and 17 refer to individual sections which contain the unitary structures hereinbefore referred to. That section identified as 17 may be removed in the direction of the arrow 18. It will be noted that these sections are arranged so that an insertion of the plug shown hereinafter in Fig. 2 will readily contact with the leads in all three of the housings, each of the leads being brought out to one conducting element, which is illustrated herein as 25, 26, 27, 28 and 29 as illustrative.

Referring to Fig. 2, there is shown a plug member which in this case contains a grasping surface 33 on which is mounted three sections 34, 35, and 36, each of the latter being mounted on the other in that order. These latter sections will, of course, be preferably formed of insulating material, but it should be appreciated that they may be formed of conducting material and the contactors 19, 20, 21, 22, 23, and 24, shown as illustrative, would then be insulated from each other and from the sections 34, 35, and 36 by some well known form of insulating material. It will be noted that the plug may then be inserted through the base member 10 and that contactors 19 through 24 will co-operate with those in the female section identified as 25 through 29. The cooperating section with plug 22, or it should be stated contactor 22, has not been labeled.

It is, of course, obvious that some form of keyway should be furnished for insuring the insertion of the plug in exactly the correct position, and this keyway would preferably be formed in the base member 10. The section of each of the cylindrical members 34, 35 and 36, which is the axis thereof, is so arranged in Fig. 2 as to make all of the axes coincident. This, of course, may be used but is not entirely necessary, being merely a preferable construction.

What I claim is:

1. An electrical apparatus wherein energizing potentials are applied to discrete removable unitary parts thereof, individual socket means having a plurality of mutually insulated conducting contacts affixed thereto mounted on each of said unitary parts and mounted substantially coaxially each to the other, and a single plug member having mutually insulated conducting contacts thereon complementary to all of the mutually insulated contacts on said socket means for simultaneously contacting all of said mutually insulated contacts on said socket means for the purpose of supplying energy thereto.

2. In a television camera containing a plurality of discrete removable unitary electrical units, insulating means affixed to each of said electrical units, a plurality of conducting contact members mounted in each of said insulating means, all of said insulating means being affixed to said unitary structures substantially coaxially each with the other, and a single plug member having mutually insulated conducting contacts thereon complementary to all of the mutually insulated contacts affixed to said insulating means for simultaneously contacting all of said mutually insulated contacts for the purpose of supplying energy thereto.

3. Apparatus in accordance with claim 1 wherein said individual socket means have progressively changing diameters.

HELMUT KÖHLER.